UNITED STATES PATENT OFFICE.

THOMAS EGLESTON, OF NEW YORK, N. Y.

METHOD OF AND COMPOUND FOR PRESERVING STONE.

SPECIFICATION forming part of Letters Patent No. 323,128, dated July 28, 1885.

Application filed March 13, 1885. (No specimens.)

*To all whom it may concern:*

Be it known that I, THOMAS EGLESTON, of the city and county of New York, in the State of New York, have invented a new and useful Improvement in the Method of and Compounds for Preserving Stone, of which the following is a specification.

My invention is particularly applicable to the preservation of and prevention of decay in building-stone.

In many kinds of stone which are largely used for building, and especially in cities and large towns, the decay or deterioration is very rapid, and not only greatly mars or destroys the carving or ornamentation in stone, but often continues until the strength of the structure is impaired. This deterioration or decay is produced by the dissolving or wasting away of the binding material at the surface portion of the stone, and the effect of the natural elements on this binding material is greatly increased by the gases which are evolved from various waste substances in populous places.

The object of my invention is to supply the place of the natural binding material at the surface of the stone by an artificial binding material, which can be applied at small cost, and will not be dissolved and wasted away by the causes which are sufficient to destroy the natural binding material, and which will also protect the stone from the action of the weather. By thus preserving and protecting the stone at and for a little distance inward from the surface I prevent decay in the body of the stone, and thereby render it almost indestructible.

I have discovered that by combining with vegetable or mineral oil, which has been brought to the condition commonly known as "fat-oil," any suitable petroleum products—such as paraffine or vaseline—and preferably, also, sulphur, a compound may be produced which will when applied to the stone have the desired effect in preserving it.

In carrying out my invention I now prefer to employ linseed or other vegetable oil; but I may employ any suitable mineral oil. Linseed-oil when exposed to the air has the lighter elements removed from it or burned out of it by the oxygen of the air. This ordinarily requires a very long time, because the surface of the oil only is exposed; but if air, either cold or warm, and under a slight pressure, be blown through the oil from a jet or jets the intimate contact of the oxygen with the oil will be secured, and the oil will soon be brought to the condition desired. By this treatment the nature or state of the oil is greatly changed, and from a comparatively thin fluid it is converted into a viscous semi-fluid mass or gum, which is commonly known as "fat-oil." In this fat-oil, prepared as above described, many of the heavier products of petroleum—such as paraffine or vaseline—may be dissolved, and in such oil sulphur will also dissolve very readily and in large quantities. I add to the fat-oil such products of petroleum, and I also prefer to add sulphur, though I do not now consider the latter indispensable.

The petroleum products and sulphur may be added in any suitable quantities, and may be advantageously varied for treating different kinds of stone.

I may for some stone employ to each hundred pounds, by weight, of fat-oil twenty pounds of paraffine and thirteen pounds of sulphur, and these may be mixed with the oil by stirring or otherwise, and by it be dissolved.

The compound having been thus prepared is ready for use. It may be applied to the surface of the stone by a brush, it being slightly warm to render it more fluid. When applied, the compound forms a gum impervious to atmospheric influences, which saturates the stone from its surface slightly inward, and forms, as it were, an artificial binding material which will not wash out or be dissolved. It also renders the stone water-proof and protects its surface.

What I claim as my invention, and desire to secure by Letters Patent, is—

1. The method of preserving stone, consisting in saturating its surface with fat-oil, substantially as herein described.

2. The method of preserving stone, consisting in saturating its surface with petroleum products dissolved in fat-oil, substantially as herein described.

3. The method of preserving stone, consisting in saturating its surface with a compound of fat-oil, petroleum products, and sulphur, substantially as herein described.

4. The compound for preserving stone, consisting of fat-oil having in solution petroleum products and sulphur, substantially as herein described.

THOS. EGLESTON.

Witnesses:
C. HALL,
FRED HAYNES.